March 24, 1959
G. H. HOWLETT
2,878,681
COUPLING FOR AUXILIARY TRANSMISSION
IN VEHICLE DRIVE MECHANISM
Filed Aug. 5, 1957
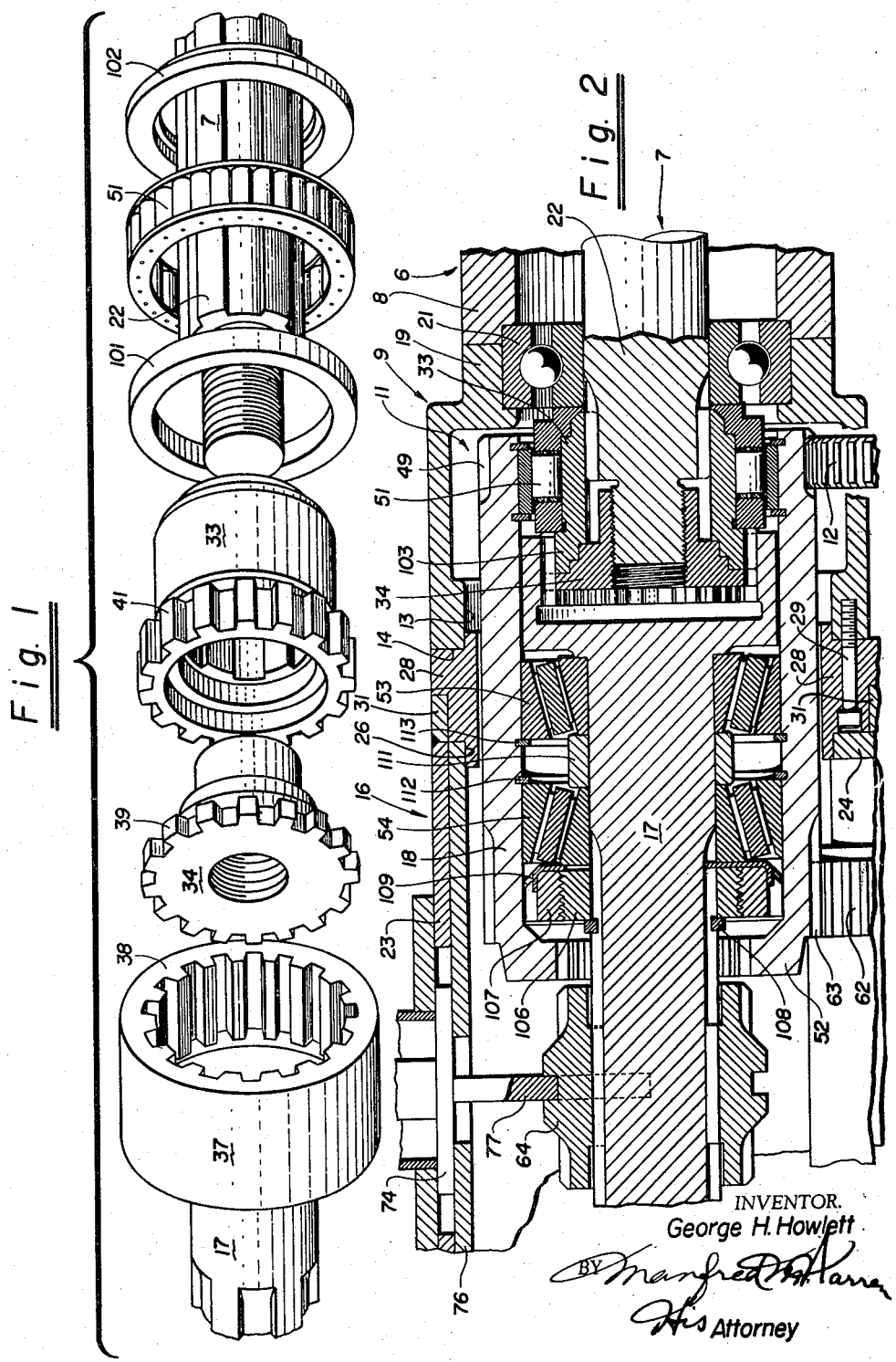
INVENTOR.
George H. Howlett
BY
His Attorney

United States Patent Office 2,878,681
Patented Mar. 24, 1959

2,878,681

COUPLING FOR AUXILIARY TRANSMISSION IN VEHICLE DRIVE MECHANISM

George H. Howlett, Oakland, Calif.

Application August 5, 1957, Serial No. 676,052

4 Claims. (Cl. 74—15.66)

The invention relates to drive mechanisms for automotive vehicles and to the addition of a second or auxiliary transmission such as disclosed in my co-pending application Serial No. 479,480 filed January 3, 1955, Patent No. 2,807,962, October 1, 1957, for Vehicle Drive Mechanism, in relation to which co-pending application this application is a continuation in part.

One of the principal problems in the insertion into the drive mechanism of an auxiliary transmission of the character described centers around the making of a power connection to the conventional threaded splined stub shaft of the existing transmission. The principal objects of the present invention are to effect this connection in a relatively simple structure and easily accomplished manner, and to provide a coupling construction which will readily accommodate for original equipment and other manufacturing inaccuracies and tolerances, which will positively, safely and efficiently handle and transmit the full torque and power capabilities of the system and be of sufficiently rugged construction to withstand the heavy use and likely abuse to which it is subjected.

The invention possesses other objects and features of advantage, some of which, with the foregoing, will be set forth in the following description of the preferred form of the invention which is illustrated in the drawing accompanying and forming part of the specification. It is understood, however, that variations in the showing made by said drawing and description may be adopted within the scope of the invention as set forth in the claims.

Referring to said drawing (one sheet):

Figure 1 is an exploded perspective view of a coupling of certain of the parts making up the coupling of the present invention.

Figure 2 is a cross-sectional view of the assembled coupling.

With reference to this and my aforesaid co-pending application, the vehicle drive mechanism of the present invention consists, briefly, of a transmission 6 having an output shaft 7 projecting from an end wall 8 thereof, a transfer case 9 which in the present illustration is secured to the wall 8 and is provided with an interior chamber 11 for receiving the shaft 7 and which is provided within the chamber with an input gear 12 arranged in juxtaposition to the shaft 7 for operable connection thereto, the connection, normally consisting of a gear mounted on the shaft 7, being removed in the present instance so as to render idle the gear 12. Additionally, the transfer case 9 is provided with a power take-off opening 13 in a side 14 opposite to the transmission 6 and which opens to the chamber for providing access to the outer end of shaft 7. Normally, the power take-off opening 13 is covered by a closure plate (not shown) when the power take-off is not in use.

As described in my co-pending application, I provide an auxiliary power transmission 16 which is arranged for connection to the side 14 of the transfer case at the power take-off opening 13, and which provides the operative connection between the transmission shaft 7 and the in-put gear 12 so as to provide a desired connection therebetween. For this purpose, the auxiliary transmission is provided with concentrically arranged drive and driven members 17 and 18, which are connected to the shaft 7 and gear 12, and a variable torque transmitting means (not shown in this application but fully disclosed in my co-pending application) connecting the concentric members 17 and 18, and which means is constantly under the manual control of the operator.

The transfer case 9 may be mounted at or remote from the transmission. As here shown, it is arranged with one wall 19 abutted against the end wall 8 of the transmission so as to provide a double wall in which is mounted an end bearing 21 for the shaft 7, the latter being inserted through the bearing 21 with the forward end portion 22 of the shaft projecting into the interior chamber 11 of the transfer case in alignment with the power take-off opening 13 in the opposite side 14 of the case. In a similar manner, the housing 23 of the auxiliary transmission 16 is fastened with side wall 24 thereof against the side 14 of the transfer case and is arranged with an opening 26 in the wall 24, in registration with the opening 13 so as to communicate the interior chamber 27 of the auxiliary transmission with the interior chamber 11 of the transfer case. To facilitate this attachment, an adapter plate 28 is secured by bolts 29 to the end 14 of the transfer case, and a stud plate 31 is welded to the side 24 of the housing of the auxiliary transmission and which is in turn secured as by bolts (not shown) to the adapter plate 28.

As above noted, the gear which is normally carried by the outer end 22 of the transmission shaft for engagement with the in-put gear 12 of the transfer case is removed in the organization of the present invention; and in its place, a shaft extension is secured to the outer end 22 of the shaft 7, by the coupling of the present invention, the shaft extension being hereinabove referred to as the inner concentric drive member 17.

The present coupling utilizes the splined, threaded construction of the stub end 22 of the transmission output shaft 7 and includes a coupling sleeve 33 mounted on and keyed to the shaft and formed with an external spline 41, a nut 34 threaded onto the shaft and against the sleeve and being formed with an external spline 39 positionable in longitudinal alignment with the sleeve spline 41, and the provision in the shaft extension 17 of an end socket 37 receiving the nut and coupling sleeve and which is formed with an internal spline 38 in joint mating engagement with the nut and sleeve splines 39 and 41, thereby locking the nut against relative rotation with respect to the shaft end 22 and connecting the shaft extension for rotation with shaft end 22. The shaft extension 17 extends axially through and is supported by a bearing in an outer wall of housing 23, see bearing 44 and wall 46 in application Serial No. 479,480, the outer end portion of the shaft extension thus being made available for a power take-off connection.

The concentric driven member 18 consists of a tubular gear member journaled for rotation on the shaft extension 17 and is provided at one end 48 with a gear portion 49 enmeshed with the in-put gear 12. As a feature of the present invention, the tubular gear member 18 is also journaled for rotation on the coupling sleeve 33 so as to provide a co-axial support for the shaft extension 17 and the tubular gear 18 relative to shaft 7. This arrangement is most important in permitting the use of wide tolerances in the construction of the interfitting splines 38, 39 and 41, permitting these splines to function solely for the transmission of torque while the co-axial support and alignment of the parts is effected and carried by an annular bearing 51 journaling the tubular gear member on the coupling sleeve 33. As will be observed from the drawing, bearing 51 is anchored against endwise movement by the mounting of the bearing in an annular bearing cup carried by and surrounding sleeve 33 and formed by a pair of spacer rings 101 and 102 surrounding and keyed to the coupling sleeve 33 and containing roller bearing 51 therebetween. In the preferred arrangement as illustrated, ring 101 is positioned at the inner end of the coupling sleeve and snubs up against bearing 21 to support this bearing against endwise displacement when the parts are locked up by the threading of nut 34 onto the threaded end of the shaft against the outer end 103 of the sleeve.

In order to support the bending load on the shaft extension and tubular gear connection, I mount between these parts a pair of longitudinally spaced bearings 53 and 54, preferably of the roller type as here illustrated. These bearings may be secured in place on the shaft extension 17 by lock nuts 106 and 107 keyed to the shaft by snap-ring 108 and held in adjusted relation by lockwasher 109 keyed to the outer nut 107 and to the shaft extension 17, see Figure 2. A bearing spacer 111 and snap-rings 112 and 113 are here shown mounted between bearings 53 and 54. By reason of the above construction it will be seen that shaft extension 17 and tubular gear member 18 are rigidly supported in co-axial relation by the two longitudinally spaced bearings 53—54, and the tubular gear member is positively held in co-axial relation to the shaft end 22 by bearing 51.

Preferably the sleeve spline 41 is formed at the sleeve end 103 as an annular set of circumferentially spaced outwardly projecting spline teeth, see Figure 1, and the nut spline 39 is similarly formed as an annular set of circumferentially spaced outwardly projecting spline teeth which may be readily lined up longitudinally with spline teeth 41. In keeping with this structure, the socket spline 38 is here formed as an internal ring gear having an annular set of circumferentially spaced inwardly projecting spline teeth which may be enmeshed with the nut and sleeve spline teeth 39 and 41.

For a full disclosure of the variable torque or auxiliary transmission means connecting the shaft extension 17 and the tubular gear 18, reference is made to my co-pending application aforesaid. Shown in Figure 2 is gear portion 63 on the outer end 52 of the tubular gear member 18, and which is enmeshed with a gear 62 of the auxiliary transmission carried on a counter-shaft (not shown); a shifter dog sleeve 64 splined on shaft extension 17 for longitudinal reciprocation between the tubular gear member 18 and another longitudinally spaced gear (not shown); and a sliding part 74 carried for reciprocation at the top wall 76 of the transmission housing and connected to the manual shift lever (not shown) and having a depending yoke 77 engaging the selector member 64. For the remainder of the auxiliary transmission structure, reference is made to my co-pending application Serial No. 479,480, which is incorporated herein by reference. For convenience in understanding, the reference numerals used in the aforesaid application Serial No. 479,480 have been adopted in this application and applied herein to the corresponding parts wherever applicable.

I claim:

1. In a coupling for an auxiliary transmission, a transmission out-put shaft having a threaded end, a coupling sleeve mounted on and keyed to said shaft and being formed with an external spline, a nut threaded onto said shaft and against said sleeve and being formed with an external spline positionable in longitudinal alignment with said sleeve spline, and a shaft extension provided with an end socket receiving said nut and coupling sleeve and formed with an internal spline in joint mating engagement with said nut and sleeve splines thereby locking said nut against relative rotation with respect to said shaft and connecting said shaft extension for rotation with said shaft.

2. In a vehicle drive mechanism, a transmission having a threaded out-put shaft and juxtaposed in-put gear, a coupling sleeve mounted on and keyed to said shaft and formed with an external spline, a nut threaded onto said shaft against said sleeve and being formed with an external spline positionable in longitudinal alignment with said sleeve spline, a shaft extension provided with an end socket receiving said nut and sleeve and being formed with an internal spline in joint mating engagement with said aligned nut and sleeve splines, and a tubular gear member journaled for rotation on said shaft extension and enmeshed with said gear.

3. In a vehicle drive mechanism, a transmission having a threaded out-put shaft and juxtaposed in-put gear, a coupling sleeve mounted on and keyed to said shaft and formed with an external spline, a nut threaded onto said shaft against said sleeve and being formed with an external spline positionable in longitudinal alignment with said sleeve spline, a shaft extension provided with an end socket receiving said nut and sleeve and being formed with an internal spline in joint mating engagement with said aligned nut and sleeve splines thereby locking said nut against relative rotation with respect to said shaft and connecting said shaft extension for rotation with said shaft, and a tubular gear member enmeshed with said gear and having co-axial portions journaled for rotation on said shaft extension and said sleeve to provide a co-axial support of said shaft extension and said tubular gear relative to said shaft.

4. In a vehicle drive mechanism, a transmission having a threaded out-put shaft and juxtapositioned in-put gear, a coupling sleeve mounted on and keyed to said shaft, an annular bearing cup carried by and surrounding said sleeve, a bearing mounted in said cup and anchored therein against longitudinal displacement, a nut threaded onto said shaft against an end of said sleeve, said sleeve being provided at said end with an annular set of circumferentially spaced outwardly projecting spline teeth, said nut being formed with an annular set of circumferentially spaced outwardly projecting spline teeth in longitudinal registration with said sleeve teeth, a shaft extension provided with an end socket receiving said nut and sleeve and being formed with an internal ring gear enmeshed with said nut and sleeve teeth thereby locking said nut against relative rotation with respect to said shaft and connecting said shaft extension for rotation with said shaft, a plurality of longitudinally spaced bearings carried by said shaft extension, and a tubular gear enmeshed with said in-put gear and journaled on said bearings to provide a co-axial support for said shaft extension and said tubular gear.

References Cited in the file of this patent

UNITED STATES PATENTS 2,807,962   Howlett _____ Oct. 1, 1957